United States Patent [19]

Fox

[11] Patent Number: 4,534,375

[45] Date of Patent: Aug. 13, 1985

[54] PROPORTIONAL SOLENOID VALVE

[75] Inventor: Clarence D. Fox, Decatur, Ill.

[73] Assignee: Borg-Warner Corporation, Chicago, Ill.

[21] Appl. No.: 645,191

[22] Filed: Aug. 29, 1984

Related U.S. Application Data

[63] Continuation of Ser. No. 349,488, Feb. 17, 1982, abandoned, which is a continuation-in-part of Ser. No. 311,820, Oct. 16, 1981, abandoned.

[51] Int. Cl.³ ................ F16K 31/06; F15C 3/00
[52] U.S. Cl. .................................... 137/82; 251/30.02; 251/129.21; 137/907; 137/625.61; 137/625.64
[58] Field of Search ............... 251/141, 139, 30; 137/DIG. 8, 625.61, 625.64

[56] References Cited

U.S. PATENT DOCUMENTS

| | | | |
|---|---|---|---|
| 2,169,683 | 8/1939 | Dunham et al. | 137/DIG. 8 |
| 2,860,850 | 11/1958 | Rhodes et al. | 251/139 |
| 3,136,220 | 6/1964 | Kamm | 251/334 X |
| 3,219,095 | 11/1965 | Nilsson | 251/129 X |
| 3,429,340 | 2/1969 | Opel et al. | 137/625.65 |
| 3,498,330 | 3/1970 | Paige | 251/141 X |
| 3,521,854 | 7/1970 | Leiber et al. | 251/141 X |
| 3,534,770 | 10/1970 | Kowalski | 137/509 |
| 3,545,472 | 12/1970 | Franz | 137/116.5 |
| 3,586,287 | 6/1971 | Knobel | 251/141 X |
| 3,688,495 | 9/1972 | Fehler et al. | 251/141 X |
| 3,817,488 | 6/1974 | Mack | 251/30 |
| 3,861,644 | 1/1975 | Knape | 251/139 |
| 4,251,052 | 2/1981 | Hertfelder et al. | 251/129 |

Primary Examiner—Arnold Rosenthal
Attorney, Agent, or Firm—Florian S. Gregorczyk

[57] ABSTRACT

A diaphragm operated valve assembly is controlled by an electromagnetic valve assembly. A flat disc armature, which forms part of a flux path, is operable in an inner chamber to modulate the flow between the inner chamber and an exit port in response to an applied magnetic force. The level of the effective magnetic force is a function of the armature mass, and the pressure acting on the disc surface. A pole piece adjacent to the flat disc armature is slidably adjustable to establish a specified force to actuate the armature to the closed or sealing position. This specified force is proportional to the current flow through the winding of the electromagnetic valve assembly. Thus the armature operates to seal communication between the inner chamber and the exit port at a given pressure differential as a function of current flow. The travel distance between the armature and a nonmagnetic seal seat has been minimized by spring biasing the armature in proximity to the seal seat.

22 Claims, 14 Drawing Figures

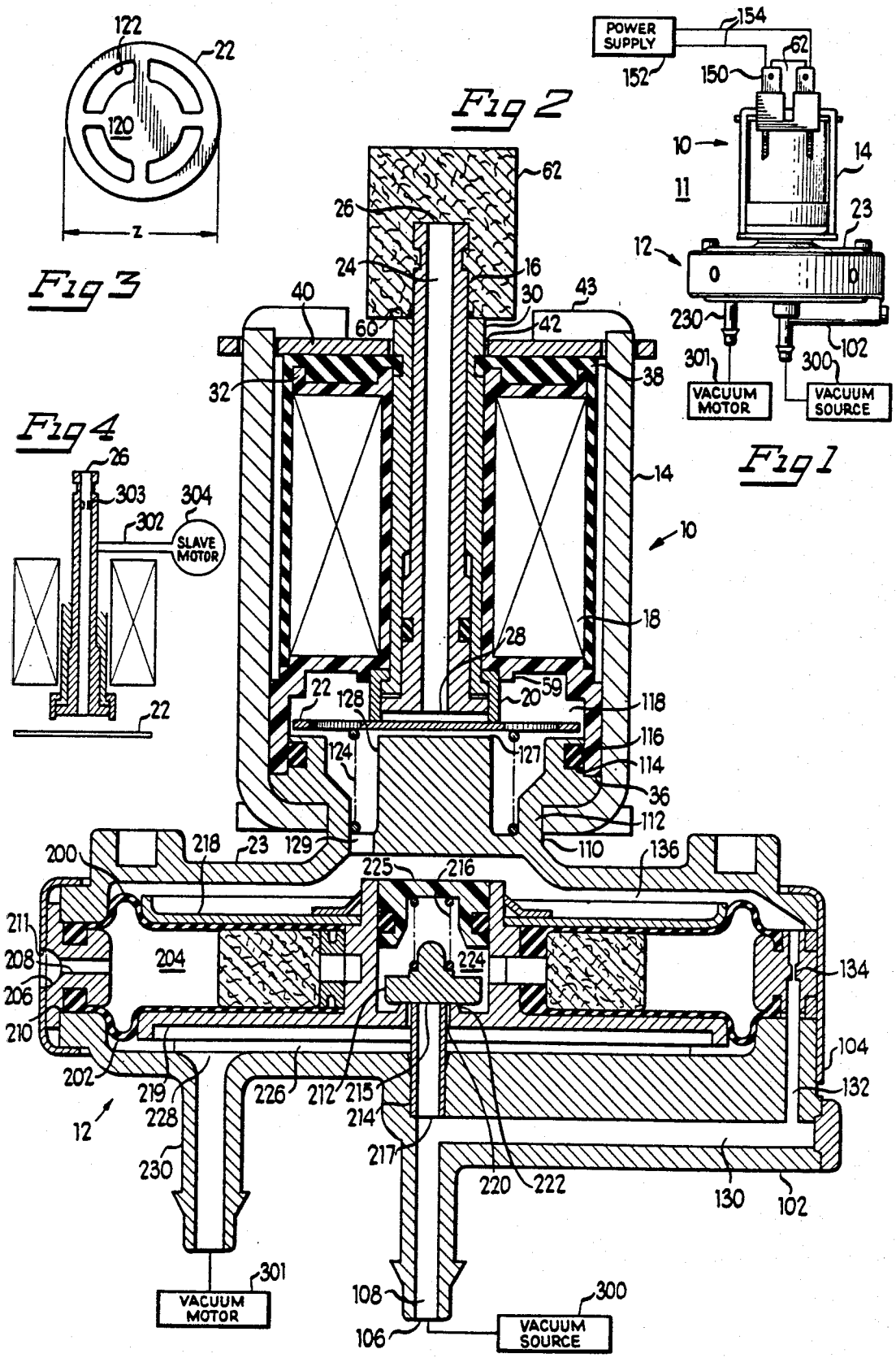

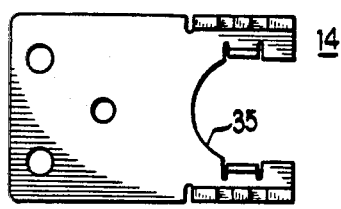
Fig 5A
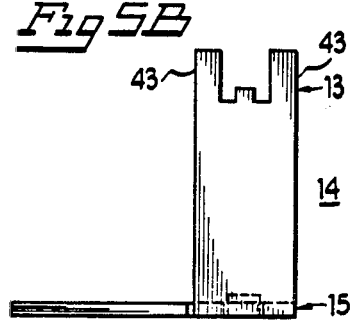
Fig 5B
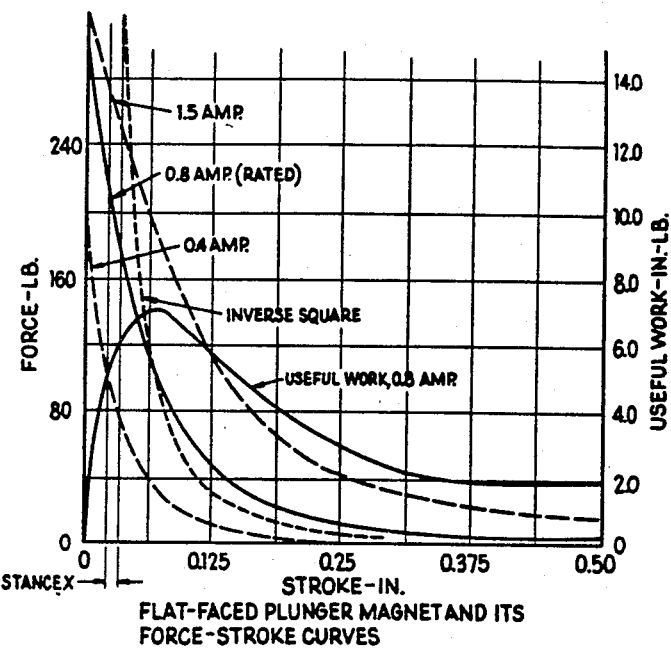
FLAT-FACED PLUNGER MAGNET AND ITS
FORCE-STROKE CURVES
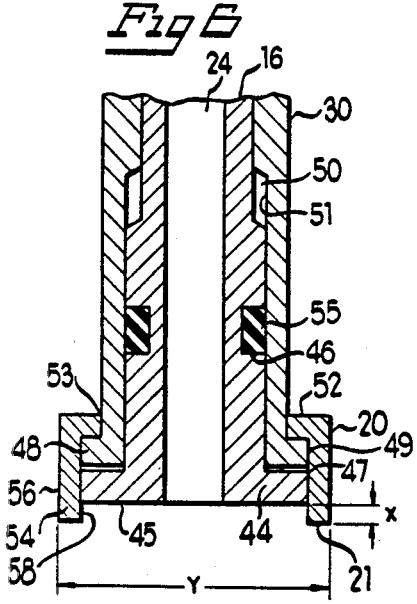
Fig 6
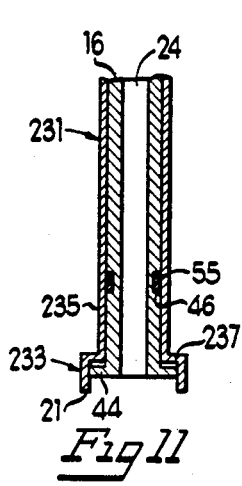
Fig 7
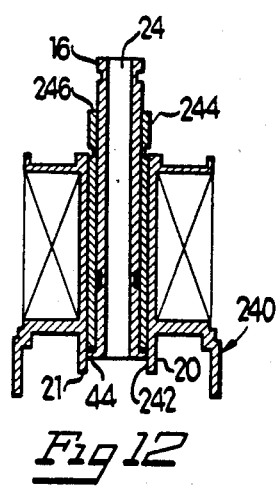
Fig 12
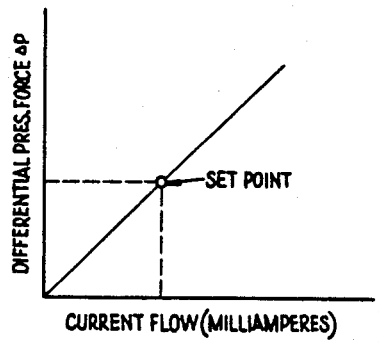
Fig 8

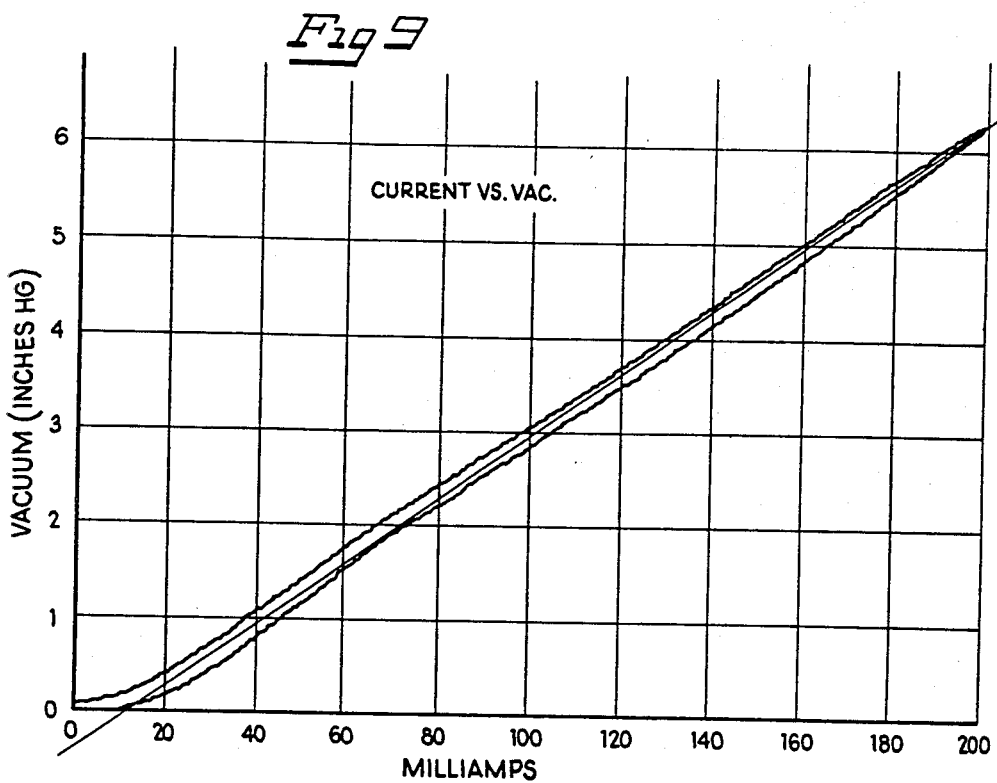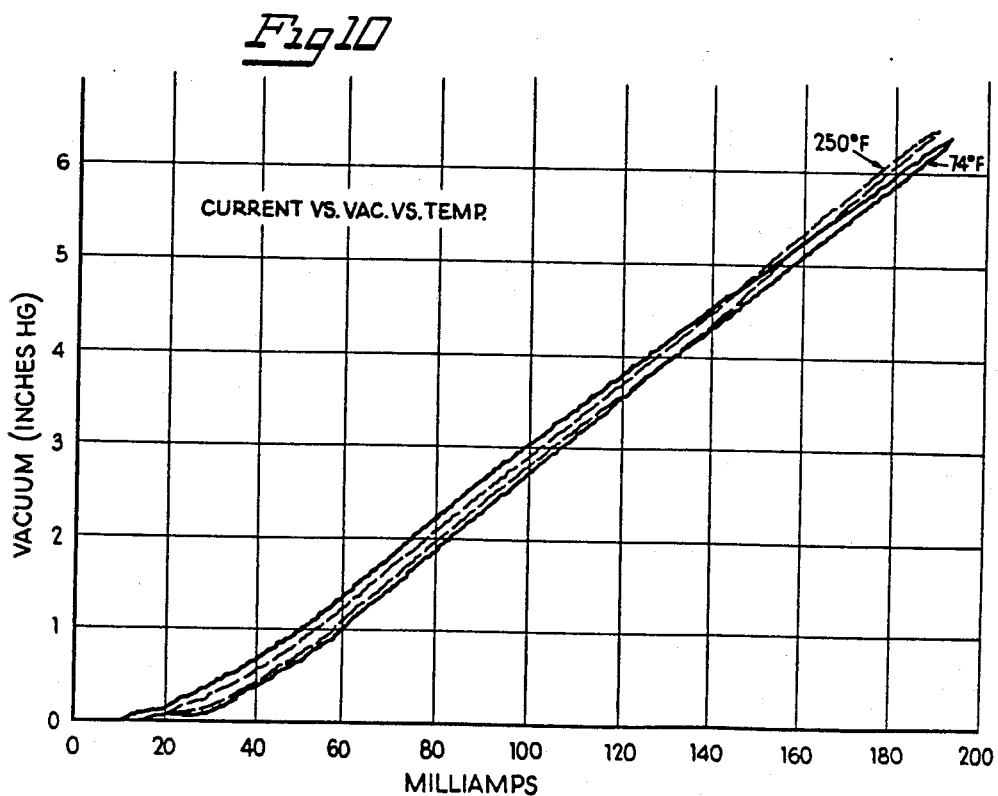

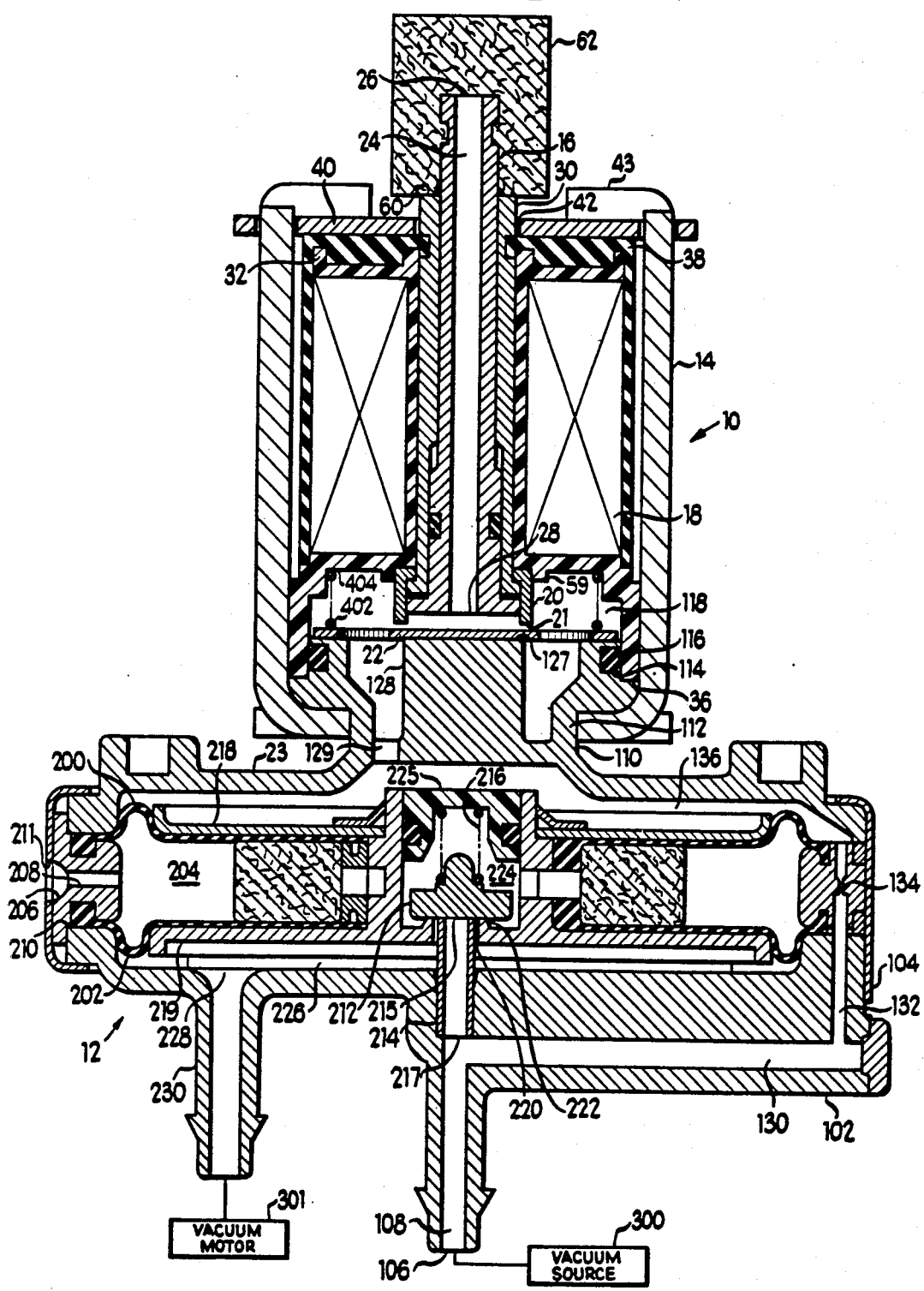

PROPORTIONAL SOLENOID VALVE

This application is a continuation of application Ser. No. 349,488 filed Feb. 17, 1982, now abandoned, which was a continuation-in-part of application Ser. No. 311,820 filed Oct. 16, 1981, now abandoned.

BACKGROUND OF THE INVENTION

The present invention is useful with an electromagnetic solenoid valve operable for fluid contol in conjunction with a diaphragm operable valve. Such solenoid valves are known and used to control either hydraulic or pneumatic flow. Such valve combinations are often complex assemblies that are spring biased, operable in conjunction with connecting rods or ball valves, or have flexible diaphragms fabricated of special material. These devices are responsive to variations in current and/or voltage through the solenoid to permit flow through the valve as a function of fluid flow or pressure. Some of these valves operate in a steady state condition (i.e., a direct current flow at a given voltage) where the forces, such as mechanical spring bias, electromagnetic field, and/or fluid pressure, are balanced or calibrated to permit valve operation in a given mode. These valves are not generally electrically adjustable. However, in at least one case there is an adjustable means, such as a screw, to vary the fluid flow and pressure operable against a bias spring to thereby effect a change in the operation of the valve. The bias springs of these various devices are changeable, as are the number of turns of the solenoid coil, the materials of construction, and the sizes of the assemblies. These devices are somewhat complex and relatively expensive to assemble.

Such solenoid valves find particular application in modern automobiles equipped with various microprocessors that receive input signals indicating physical parameters such as exhaust gas oxygen content, vehicle speed, engine RPM, engine temperature, and so forth. Such microprocessors receive these input data signals, and evaluate and/or compare the data to produce a signal which may control fuel input, spark advance or other operating parameters. In the present case such a microprocessor is capable of producing an output signal that will actuate the solenoid valve at a given current amplitude to provide a predictable or desired output from a variable fluid source, such as a manifold vacuum. The microprocessor in the automobile case above can control the duty cycle or on-time of a square wave signal to maintain the fluid pressure or vacuum output at a desired level for a given amperage signal. This control can be achieved even though the engine compartment and solenoid temperatures vary. The current level signal can also be derived from simpler arrangements, such as a signal generator or a simple power supply, when closed loop control is not required.

Thus the present invention is directed to a less complex valve assembly, and in particular to an assembly which is electromagnetically adjustable and operable in response to a varing input electrical signal.

SUMMARY OF THE INVENTION

The present invention is useful in an electromagnetic solenoid valve assembly having a central bore terminating in a non-magnetic seat within an interior central chamber having an exit port. There is a flat disc armature or closure member operable in this chamber to contact the non-magnetic seat and thus seal flow between the bore and the exit port. This device is operable to maintain a specific pressure differential between the central bore and the exit port. The magnetically induced force required to operate the magnetic closure member is affected by the mass of the magnetic closure member and diameter of the non-magnetic seat. The magnetic closure member is perforated, serrated or otherwise marked to allow fluid flow therethrough for communication between the central bore and the exit port. This invention is operable in conjunction with known valve means. Further, the solenoid can be adapted to be operable either where the fluid pressure is used to control a vacuum operable or pressure operable device.

BRIEF DESCRIPTION OF THE DRAWINGS

In the figures of the drawing, like reference numerals identify like components, and in the drawing:

FIG. 1 is a side view of the valve assembly of this invention showing the power supply connection;

FIG. 2 is a vertical sectional view of the proportional solenoid valve of this invention, taken on a scale enlarged with respect to the scale of FIG. 1;

FIG. 3 is a plan view of a closure member shown in FIG. 1;

FIG. 4 is a sectional view of an alternative embodiment of the proportional solenoid valve;

FIG. 5(A) is a plan view of the mounting bracket;

FIG. 5(B) is a side view of the mounting bracket;

FIG. 6 is an enlarged view of the non-magnetic seat and magnetic control member assembly;

FIG. 7 is a graphical illustration of force versus stroke (travel distance of an armature) for a solenoid type device;

FIG. 8 is a graphical illustration of the linear output of the invention;

FIG. 9 graphically illustrates a plot of empirical data for a pressure differential as a function of current;

FIG. 10 graphically illustrates temperature effects on the operation of this invention;

FIG. 11 is an enlarged view of an alternative embodiment of a one-piece sleeve and nonmagnetic seat assembly;

FIG. 12 is an enlarged view of an alternative embodiment of a nonmagnetic seat and bobbin one-piece assembly; and FIG. 13 is a vertical sectional view of alternative embodiment of the proportional solenoid valve.

DETAILED DESCRIPTION OF THE PREFERRED EMBODIMENT

An electromagnetic valve assembly 10 constructed in accordance with the invention is shown in FIG. 1 as vertically oriented, and is illustrated as cooperating with a diaphragm operated valve assembly 12 to form an operating combination 11 for use in a vehicle or other apparatus. The operating combination 11 is coupled between a vacuum source 300 and a vacuum operable motor 301. A vacuum, in the sense used herein, is a pressure below atmospheric pressure. The electromagnetic valve assembly 10 includes an outer member or a mounting bracket 14 in FIGS. 2, 5A and 5B, having a top 13 and a bottom 15, a hollow cylindrical magnetic core pole piece or center member 16, an electrical winding 18 mounted about center member 16, a non-magnetic material seat 20 with a lower face 21 (see FIG. 6), an annular magnetic closure member 22 (FIG. 3), and a base member 23 which defines at least one aperture 129.

Shown in FIG. 1 are electrical connecting means 150, in this case a pair of terminals, connectible over a pair of conductors 154 to a suitable power supply 152. The power supply can be a direct current source, a square wave generator, a variable resistor, a pulse width modulation circuit, or an automobile on-board computer functioning as a signal source.

Pole piece 16 defines a cylindrical central passage or bore 24 with an inlet port 26 and an exit port 28. Mounted about pole piece 16 is a cylindrical sleeve or reference member 30 which is preferably of a magnetic material for improved flux density. The electrical winding 18 is encased on its upper, lower and inner diameter surfaces in a bobbin 32 generally of plastic material, which bobbin 32 surrounds and engages the sleeve 30 and thereby the magnetic pole piece 16 along most of their axial dimensions. A subassembly consisting of the pole piece 16, sleeve 30, bobbin 32 and electrical winding 18 is mounted on and rigidly maintained in position in an open faced slot 35 defined by bracket 14 (FIG. 5A) and a flange 36 defined by bobbin 32. In this preferred embodiment, an encapsulant 38 surrounds the outer diameter of the winding 18, although this encapsulant is not a functional requisite. A washer retainer or top member 40, preferably of a magnetic material, is mounted atop the encapsulant 38 in FIG. 2 and defines an aperture 42. The pole piece 16 and sleeve 30 protrude through aperture 42. Bracket 14 defines tabs 43 at its upper extremity which are formed over washer-retainer 40 to secure said retainer 40 and the subassembly in bracket 14.

As shown in FIG. 6, pole piece 16 defines a seal slot 46 near its lowermost portion, and pole piece 16 terminates in a flange or right angular foot 44 having an outer diameter 47 and a lower surface 45. Sleeve 30 at its lower extremity defines a flange 48 with outer diamter 49, and a counterbore 50 with a wall 51. Non-magnetic seat 20 defines shoulder 52, an aperture 53, wall 54 having outer surface 56 and an inner surface 58, and a diameter noted as 'y' in FIG. 6. Outer diameters 47 and 49 of flanges 44 and 48, respectively, are equal and contact inner surface 58 of seat 20. Flange 48 of sleeve or reference member 30 abuts shoulder 52 and is press fit and retained in aperture 53. Pole piece 16 is adjustable along its vertical axis to abut flange 48 with flange 44 or to bring lower surface 45 of pole piece or center member 16 into closer proximity with the lower face 21 of seat 20 and closure member 22. Thus, pole piece 16 is adjustable to meet a specified force requirement that is a function of distance.

Alternative embodiments of the pole piece 16, seat 20 and sleeve 30 configuration are illustated in FIGS. 11 and 12. FIG. 11 depicts an assembly where sleeve 30 and nonmagnetic seat 20 are shown as a single, drawn, nonmagnetic element 231 which are of a thin-wall tubing material. This tubing thickness can be on the order of 0.012 inch, providing an increased wall thickness of pole piece 16 to improve magnetic flux density. Nonmagnetic element 231 includes a seat area 233 and a tubular extension 235 having a cylindrical shape. The outer and inner diameter of seat 233 are greater than those dimensions of tubular extension 235, and seat 233 defines a shoulder 237 against which right angle foot 44 of pole piece 16 may be restrained in its upward travel. Seat 233 further defines lower face 21 for contact with closure member 22. Pole piece 16 is again adjustable to meet a specified force requirement as a function of the distance to closure member 22.

FIG. 12 shows a second alternative embodiment of the nonmagnetic seat 20 wherein the seat 20 and bobbin 32 are cast, molded or otherwise formed of a nonmagnetic material as an unitary assembly 240. Assembly 240 in FIG. 12 defines a cylindrical passage 242 to receive a sleeve 244 with a wall 246 similar to sleeve 30 of FIGS. 2 and 6 but not having a flange 48 which extends beyond the thickness of wall 246. Pole piece 16 is slidable in sleeve 244 and is restrained in its upward travel to contact wall 246 with flange 44. Pole piece 16 is slidable to vary the relationship between flange 44 and seat face 21, and is thus adjustable to meet a specified force requirement as a function of its distance from closure member 22. In this embodiment sleeve 244 may be of a magnetic material and it may be either thin or thick wall, as it is no longer integral with the nonmagnetic seat 20 and can be utilized to increase the magnetic flux density.

In FIG. 2 bobbin 32 defines a shoulder 59. In FIG. 6 outer wall 56 and shoulder 52 of seat 20 bear against and are rigidly retained by shoulder 59. The distance between the seat face 21 and the pole piece lower surface 45, as shown in FIG. 6, is designated as a distance 'x'. A gasket 55 for sealing its positioned in seal slot 46 of pole piece 16 to contact the counterbore wall 51 and provide a seal therebetween. The attainment of the proper height setting, that is, the distance 'x', is thereafter set by securing pole piece 16 to sleeve reference member 30 at its upper surface 60 by any means known in the art, such as welding. A filter 62 is positioned atop pole piece 16 to prevent particulate entrainment through the solenoid valve assembly. Filter 62 can be of a cellulose material.

Diaphragm valve operator 12 illustrates the use of the electromagnetic valve assembly 10 to control vacuum supply 300 to a vacuum motor 301. Valve operator 12 has a bottom cover 102 secured to base member 23 by a shell 104. Bottom cover 102 defines a port 106 and passage 108 which communicate to a vacuum source 300. Base member 23 defines neck 110 and flange 112 with a seal slot 114 to receive a gasket or seal 116. Flanges 36 and 112 abut each other and seal 116 forms an airtight seal therebetween. Neck 110 is positioned in slot 35 of bracket 14 to retain diaphragm valve operator 12 in communication with electromagnetic valve assembly 10. Flange 112 of base member 23 and bobbin 32 cooperate to define an annular chamber 118 wherein annular magnetic closure member 22 is operative to engage seat 20. Closure member 22, shown in FIG. 3, has an inner face 120 and an overall diameter 'z'. Closure member 22 defines apertures 122 which allow fluid communication through member 22. As shown in FIG. 2, closure member 22 is maintained in close proximity (a distance the order of 0.0015 inch) to nonmagnetic seat 20 with face 21. Generally, seat 20 is of a soft material such as brass and closure member 22 is of a harder material such as iron or steel such that this produces the combination of a soft material touching a harder material upon contact of these two members. The hard-soft contact provides a minimal deformation but such deformation allows for better seating and tighter sealing as inner face 120 of closure member 22 operates to contact seat face 21 of seat 20 to thereby restrict communication between passage 24 and chamber 118. Seat 20 can also be a hard material such as nonmagnetic stainless steel or plastic. During normal operation, closure member 22 is maintained in close proximity to seat 20 by a spring 124 mounted on base member 23. Base 23 includes an upstanding cylindrical portion 128 terminating in a generally flat surface area 127. Spring 124 is positioned around cylindrical portion 128, and surface area 127 aids in positioning magnetic closure member 22. Cylindrical portion 128 extends into chamber 118, and its flat surface 127 limits the downward travel of closure member 22. The volume of cylindrical portion 128 also serves to limit the volume of chamber 118, and pressure and volume changes of fluid in chamber 115 are thus more rapid.

The illustrated valve 12 is a dual diaphragm operator with diaphragms 200 and 202 in a parallel relationship to each other to define therebetween an atmospheric chamber 204 which communicates to atmosphere through a plug 206 defining an aperture 208, which plug 206 is inserted in an opening 210 defined by cover 102. Aperture 208 communicates to atmosphere through port 211 defined by shell 104. Positioned above passage 108 is a connecting sleeve 214 having open ports 215 and 217. The valve 12 includes a sealing means 212 which is shown in the reference position of FIG. 2 seated upon connecting sleeve 214 to seal port 215. Movable plates 218, 219 are affixed to the diaphragm operators 200 and 202, respectively. The plate 219 defines an annular opening 220, an annular contacting ridge 222, an annular chamber 224 with a cap member 225 inserted therein to seal chamber 224. A spring 216 is seated against a cap member 225 to bias sealing means 212 to contact sleeve 214 in the reference position. Sealing means 212 contacts and seals communication from sleeve 214 and vacuum source 300 to a chamber 226 defined between plate 219 and cover 102. The chamber 226 communicates with a vacuum motor 301 through a port 228 defined by cover 102 and a connecting means 230.

Cover 102 defines passages 130 and 132 and orifice 134. Base member 23 and plate 218 cooperate to define vacuum chamber 136 therebetween. A vacuum condition is communicable to chamber 136 from the vacuum source 300 through passages 130, 132 and orifice 134, and this vacuum is communicated to chamber 118 from chamber 136 through aperture 129.

FIG. 13 illustrates an alternative embodiment of the assembly 10 shown in FIG. 2. Bobbin 32 of assembly 10 defines a lower surface 404 open to chamber 118 wherein a bias spring 402 is positioned to abut surface 404 and contact annular magnetic closure member 22. Bias spring 402 provides a force acting to maintain said closure member 22 in a normally open relationship to lower face 21 of nonmagnetic material seat 20. Further, bias spring 20 maintains closure member 22 in its reference position perpendicular to the vertical axis of bore 24 as shown in FIGS. 2 and 13. This action of maintaining the closure member 22 in the reference position has been found to prevent "cocking" or angular displacement of closure member 22 from the perpendicular relationship to the vertical axis.

OPERATION

In operation, the closure member 22, shown in FIG. 2 in the reference position contacting seat 20, is rapidly responsive to an induced magnetic flux from a current at a given voltage passed through the electrical windings or means for establishing electromagnetic flux 18 of valve assembly 10. A magnetic flux path is produced through bracket 14, closure member 22, pole piece 16, sleeve 30, washer retainer 40 and the gap distance between the exit port end of pole piece 16 and closure member 22. In a steady state condition, that is, when a direct current is passed through the windings, closure member 22 is drawn toward seat 20 and retained in that position until the magnetic flux is interrupted. At current interruption, that is, magnetic flux interruption, the closure member 22 would fall by gravity and pressure differential to the reference position to rest on spring 124 as shown in FIG. 2 which spring is a means to bias closure member 22 to the reference position.

When a pressure depression from atmosphere (i.e., a vacuum) is imposed at port 106, the vacuum condition is communicated to chambers 136 and 118 through passages 108, 130 132 and orifice 134. When the vacuum in chamber 136 is great enough to flex diaphragms 200, 202 against atmospheric pressure, the valve plates 218, 219 move vertically upward from the reference position shown in FIG. 1. As the ridge 222 moves upwardly, it lifts sealing means 212 and provides vacuum communication between passage 108 and chamber 226 through opening 220 and port 215.

In the combination of valves 10 and 12 shown in FIG. 2, a vacuum source communicates with chamber 118 of electromagnetic valve assembly 10 through port 106, passages 108, 130 and 132, orifice 134, chamber 136 and aperture 129. Pole piece 16 communicates atmosphere (air) as illustrated through port 26, passage 24 and port 28 to chamber 118.

When electrical winding 18 is energized from power supply 152, a magnetic flux is induced which attracts closure member 22 toward pole piece 16. Seat 20 contacts closure member 22 on inner surface 120, thus sealing communication between chamber 118 and passage 24. The force (magnetic flux) required to move closure member 22 is dependent upon the mass of closure member 22, the pressure differential between chamber 118 and passage 24, and the diameter 'y' of seat 20. Diameter 'y' of seat 20 and the mass of closure member 22 are fixed at the point of assembly. Thus the operational variables affecting movement of closure member 22 are the pressure differential and the magnetic force, which is proportional to the current at a voltage through windings 18.

It is known that the force of the magnetic field of an electromagnetic valve is proportional to the power input to the electrical winding as shown in FIG. 7 (Herbert C. Roters, "Electromagnetic Devices", First Edition-Tenth Printing 1967 (New York: John Wiley & Sons, Inc., 1941), p. 232). In the present example, where passage 24 is at atmospheric pressure and a vacuum (pressure below atmospheric) is being introduced into chamber 118, there is a pressure differential operating on inner surface 120 to maintain closure member 22 open. The attractive force of the magnetic flux must overcome the mass (about 1.4 grams) of member 22, gravity and the downward pressure force acting on surface 120 to maintain the closure member 22 seated on spring 124 in the reference position. As the mass of member 22 is fixed, the magnetic force required to move it is a function of pressure differential. This magnetic force has been found to be proportional to the current (amperage) through the electrical windings 18, as is illustrated in FIG. 8 in the ideal case. An empirical illustration of the change of the pressure differential (vacuum in inches of mercury) as a function of the current in milliamperes for the invention is given in FIG. 9. The linear function in FIG. 9 has the appearance of a hysteresis loop, but a straight line function is superimposed between those loops as a close approximation of the ideal case in FIG. 8. This function of FIG.

9 is for a solenoid having 43 ohms resistance, with an electrical input at 160 hertz and operating against an input vacuum of 14 inches of mercury. Similar curves have been determined for varying resistances, frequencies and pressure differentials.

It has been found that for a square wave input signal at lower frequencies, such as about 80 hertz, there may be a shift in the set point for a significant change in the input vacuum level, such as from five (5) inches of mercury vacuum to twenty (20) inches of mercury vacuum. For such low frequency operation, it has been found that orifice 134 can be provided with a laminar or jet-flow structure to improve fluid flow characteristics to relieve this set-point shift problem.

Any given point along the straight line function may be selected and defined as the set point. At this set point, the corresponding amperage for a solenoid with the characteristics that produced this curve will induce a magnetic field strong enough to attract closure member 22 to seat 20 against the pressure depression from atmospheric (vacuum) to seal communication between passage 24 and chamber 118.

Thus the operation to contact seat 20 is dependent upon a fixed or given amperage and will operate to close communication between chamber 118 and passage 24 when the pressure differential between these volumes is at or below the set point along the curve.

It is to be noted that the vacuum condition in chamber 118 is communicated through the orifice 134. There is a significant difference between the diameters of passage 24 and orifice 134 and seat 20. As an example, in a given application, the orifice 134 size was about 0.020 inch diameter the passage 24 size was about 0.060 inch diameter and seat 20 diameter was about 0.300 diameter. However, the pressure differential between chamber 118 and passage 24 is a function of the magnetic force exerted on the closure member 22, as the distance between seat face 21 and closure 22 is very small. The fact that the orifice 134 is shown in the valve 12 does not affect the operation of the solenoid 10 as a similar connecting orifice could be positioned in communicating means 129 or be integral to valve 10.

The operation of this device is shown as being proportional to a given electrical power, amperage or voltage input to the electrical winding 18. The curves of the Roters' reference above are shown in FIG. 7 as a family of curves on Cartesian coordinate axes. As noted, the horizontal axis is the armature (closure member 22 in our case) stroke length in inches and the vertical axis is force in pounds. In the present case, the armature stroke is a very small incremental distance, that is, on the order of about 0.0015 inch. However, as there is a fixed distance 'x' from pole piece 16 to the lower surface 21 of seat 20, the stroke length distance through which this force must act is (x+0.0015 in.). Therefore, the actual travel of closure member 22 has been minimized for more rapid response and better control. If a vertical pair of lines is drawn at distances x and x+0.0015 along the horizontal axis in FIG. 7, they would intersect the family of curves at the various amperage levels. Thus this solenoid operates over a very narrow range of these variables, thereby giving better control of its operation to modulate the flow between the chamber 118 and bore 24.

The solenoid valve will open and close at any set point, that is, any point along the straight line function of FIG. 8. In this case, the pressure differential can be selected to respond to a given current input or the current input (illustrated on the horizontal axis in FIG. 8) can be selected to move closure member 22 at a given pressure differential. In either situation, the valve 10 has been found to be temperature insensitive at a given peak amperage over the normal operating temperatures of an automobile engine compartment. This condition prevails in the case of the automobile on-board computer as a signal source when this signal source is a square wave and the control is provided by controlling the duty cycle, that is, that percentage of the period when the current is allowed to flow. At an elevated temperature the duty cycle is increased to compensate for this changed temperature condition. This is shown in FIG. 10 wherein the output curves were produced at two temperatures, 74° F. and 250° F. The results clearly show only insignificant changes in the curve positions.

The seat size 'y', as shown in FIG. 6, is relatively large in comparison to passage 24 diameter. This size difference is to accomodate operation with a vacuum operator, such as valve 12. Where a high pressure (above atmospheric pressure) source is affixed to pole piece 16 at passage end 26, a restriction 303 in FIG. 4 is formed in passage 24 and a connecting means 302 communicates between passage 24 and a slave motor or pressure operable device 304. The non-magnetic seat 20 for high pressure operation is constructed with a diameter generally based upon empirical tests to determine an operating mode consistent with slave motor 304 and environmental operating conditions. However, this seat size for such high pressure operation would be much more narrow relative to passage 24 than in the vacuum operation.

While only specific embodiments of the invention have been described and shown, it is apparent that various alterations and modifications can be made therein. It is, therefore, the intention in the appended claims to cover all such modifications and alterations as may fall within the scope and spirit of the invention.

What is claimed is:

1. An electromagnetic valve assembly comprising an outer member of a magnetic material, having a top and a bottom;
   a top member of a magnetic material, affixed near the top of the outer member;
   a center member of magnetic material extending through said top member and positioned generally within the outer member, which center member has a bore with an inlet port for receiving fluid, and an exit port;
   a non-magnetic seat positioned about the exit port and extending beyond the center member,
   a base member, attached to the bottom of the outer member to define a chamber adjacent the non-magnetic seat;
   a magnetic closure member, positioned within the chamber, which closure member is a flat disc armature and, with the outer member, the top member and the center member, completes a flux path including an air gap defined between the magnetic closure member and said exit port end of the center member;
   a reference member of cylindrical shape positioned about the center member; and
   means for establishing the flow of electromagnetic flux through said flux path, which means includes an electrical winding, and a bobbin substantially encircling said reference member and substantially enclosing the electrical winding, the relative positions of the center member and the closure member being adjustable to place the exit port of the center member nearer to or farther from the closure member and thus regulate the air gap distance, so that for a given level of flux in the flux path, the closure member will be urged against the non-magnetic seat as a function of the air gap distance and pressure differential between said chamber and said bore.

2. An electromagnetic valve assembly as claimed in claim 1, and further comprising a spring positioned between said base member and the magnetic closure member, to urge the magnetic closure member toward the nonmagnetic seat.

3. An electromagnetic valve assembly as claimed in claim 1, wherein the closure member is of a rigid material harder than said non-magnetic seat.

4. An electromagnetic valve assembly as claimed in claim 1, wherein said center member is slidable in the reference member and non-magnetic seat to regulate the extent of said air gap, and thus correspondingly regulate the level of pressure differential between said chamber and the bore of the center member at which a given level of electromagnetic flux in said flux path will actuate said closure member to sealingly engage said non-magnetic seat.

5. An electromagnetic valve assembly as claimed in claim 1, wherein the distance between said non-magnetic seat and closure member is about one and one-half thousandth (0.0015) inch at a reference position.

6. An electromagnetic valve assembly as claimed in claim 1, wherein the non-magnetic seat is brass.

7. An electromagnetic valve assembly as claimed in claim 1, operable with a diaphragm operator valve assembly to control the level of vacuum supplied to a vacuum-operable device.

8. An electromagnetic valve assembly as claimed in claim 4, wherein said center member is adjusted to a fixed position to maintain a given magnetic flux density at a reference current flow, to thereby actuate said magnetic closure member to maintain at least a given level of the differential pressure between the chamber and the center member bore.

9. An electromagnetic valve assembly as claimed in claim 8, wherein the magnetic center member is fixed in position with respect to the reference member.

10. An electromagnetic valve assembly as claimed in claim 8, wherein the magnetic closure member's mass, the gap distance, non-magnetic seat diameter, and the magnetic flux density is calibrated to modulate a specific pressure differential between the center member bore and said chamber.

11. An electromagnetic valve assembly as in claim 1, wherein the surface area of the non-magnetic seat and the magnetic closure member surface area operate in an inverse manner with respect to each other to affect the rate of closure member response.

12. An electromagnetic valve assembly as claimed in claim 1, wherein a restriction is positioned in said center member bore near the inlet port source connection and where a connecting means communicates said bore at a position between said restriction and exit port to a pressure operable device.

13. An electromagnetic valve assembly as claimed in claim 1, wherein the level of electromagnetic flux is a function of the current input to the electrical winding.

14. An electromagnetic valve assembly as in claim 1, wherein the pressure differential between said bore and chamber at which said closure member will be wedged against said seat is a function of the current input to the electrical winding.

15. An electromagnetic valve assembly as claimed in claim 1, wherein said reference member and nonmagnetic seat are a single element of nonmagnetic material.

16. An electromagnetic valve assembly as claimed in claim 15 wherein said single element is of drawn, thin-wall, nonmagnetic tubing.

17. An electromagnetic valve assembly as claimed in claim 1, wherein said bobbin and nonmagnetic seat are a single element of a nonmagnetic material.

18. An electromagnetic valve assembly as claimed in claim 1, wherein said bobbin defines a lower surface contacting said chamber, and further comprising a spring positioned between said bobbin lower surface and the magnetic closure member, to urge the magnetic closure member away from the nonmagnetic seat.

19. An electromagnetic valve assembly as claimed in claim 18 wherein said spring maintains said closure member in a reference position relative to a vertical axis of said bore.

20. An electromagnetic valve assembly as claimed in claim 1, wherein said base member includes an upstanding cylindrical portion terminating in a generally flat surface area, and further comprising a spring positioned around said cylindrical portion and flat surface area between said base member and said magnetic closure member, to urge the magnetic closure member toward the non-magnetic seat and aid in the positioning of said magnetic closure member.

21. An electromagnetic valve assembly as claimed in claim 1, wherein said flat disc armature defines at least one aperture.

22. An electromagnetic valve assembly as claimed in claim 1, wherein the reference member is a magnetic material to augment the flux path.

* * * * *